Aug. 20, 1957     C. A. WILSON     2,803,377
AUTOMATIC FEED FOR HOLLOW SET SCREWS
Filed Oct. 17, 1955     3 Sheets-Sheet 1
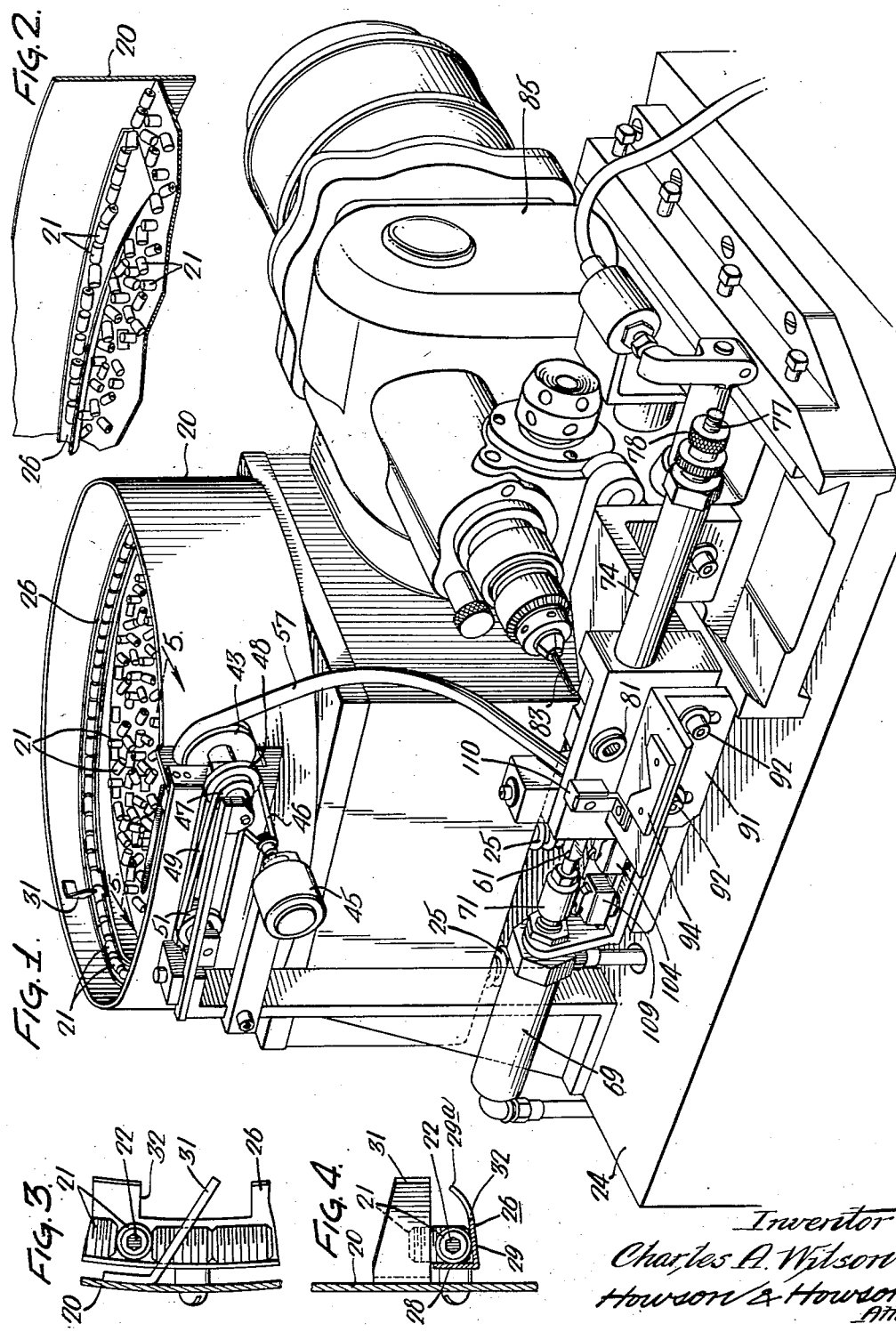
Inventor:
Charles A. Wilson
Howson & Howson
Attys.

Aug. 20, 1957  C. A. WILSON  2,803,377
AUTOMATIC FEED FOR HOLLOW SET SCREWS
Filed Oct. 17, 1955  3 Sheets-Sheet 2
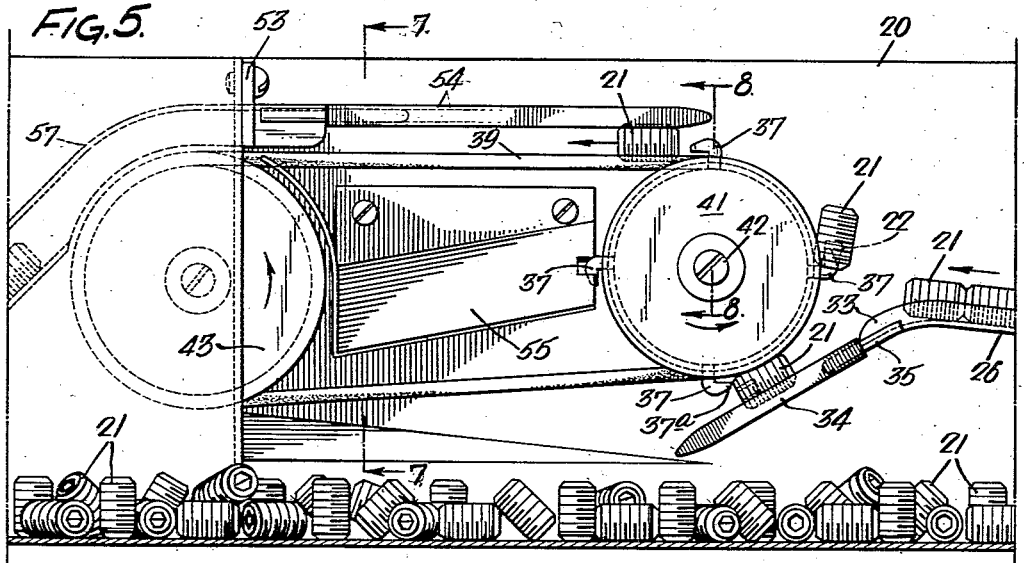
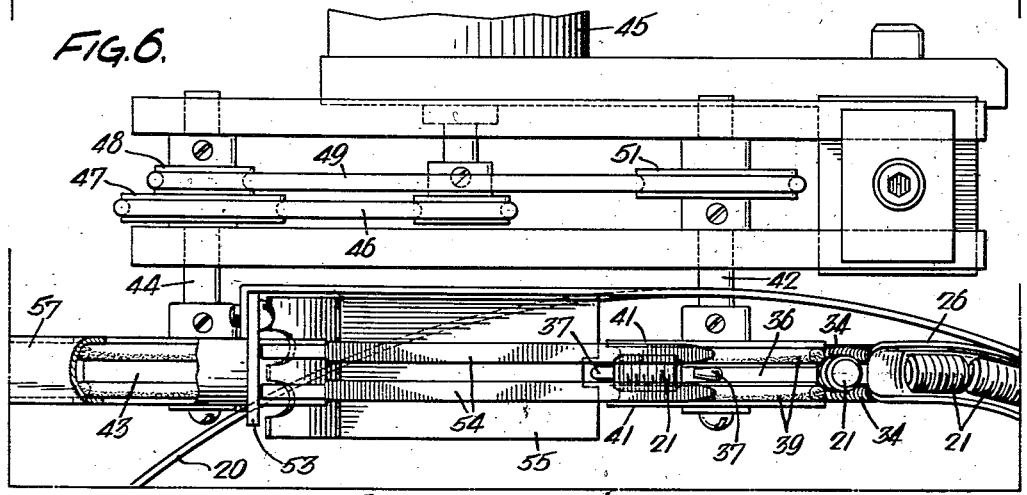
Inventor:
Charles A. Wilson
Howson & Howson
Attys

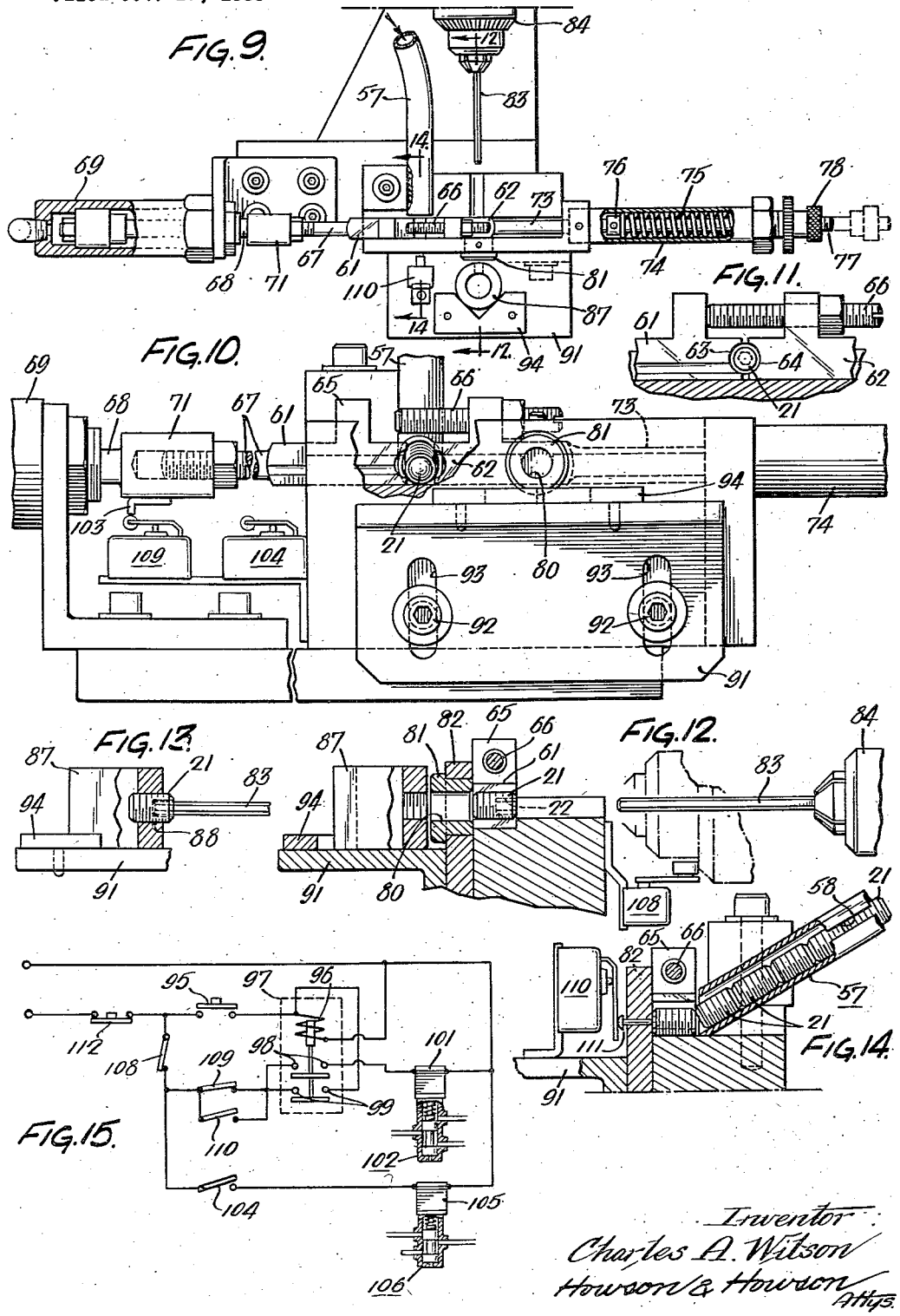

United States Patent Office 2,803,377
Patented Aug. 20, 1957

2,803,377

AUTOMATIC FEED FOR HOLLOW SET SCREWS

Charles A. Wilson, North Wales, Pa., assignor to Standard Pressed Steel Co., Jenkintown, Pa., a corporation of Pennsylvania Application October 17, 1955, Serial No. 540,950

7 Claims. (Cl. 221—162)

The present invention relates to new and useful improvements in automatic feeding and inserting apparatus and more particularly to new and useful improvements in apparatus for removing hollow set screws and the like from a hopper, feeding the set screws in predetermined positions to mechanism for inserting the set screws into a collar or other work piece, and then inserting the set screws into the work piece.

The principal object of the present invention is to provide novel automatic feeding and inserting apparatus, whereby hollow set screws and the like may be removed from a hopper, positioned in predetermined relation to a work piece and then automatically inserted into the work piece.

Another object of the present invention is to provide new and useful improvements in automatic feeding and inserting mechanism wherein set screws are automatically removed from a hopper and transported along a track longitudinally with the wrench socket of each of the set screws extending in one direction and are then moved to a predetermined position relative to inserting mechanism.

A further object of the present invention is to provide novel feeding and inserting mechanism whereby set screws are removed from a track and automatically positioned in predetermined relation to a rotary set screw-driver which is then automatically advanced into engagement with the wrench opening in the set screw to insert the set screw into a work piece.

A still further object of the present invention is to provide apparatus of the type described having the features and characteristics set forth which may be manufactured easily and cheaply and is entirely efficient and effective in operation and use.

These and other objects of the present invention and the various features and details of the operation and construction thereof are hereinafter more fully set forth and described with reference to the accompanying drawings in which:

Fig. 1 is a perspective view of the automatic feeding and inserting machine of the present invention;

Fig. 2 is a fragmentary perspective view of a portion of the interior of the hopper showing the construction and placement of the feed end of the track for initially receiving the set screws;

Fig. 3 is an enlarged fragmentary sectional view of a portion of the track, illustrating the mechanism for removing set screws which are not moving longitudinally along the track;

Fig. 4 is a fragmentary sectional view illustrating the construction of the mechanism shown in Fig. 3;

Fig. 5 is an enlarged fragmentary transverse sectional view taken on line 5—5, Fig. 1, illustrating the mechanism for removing the set screws from the feed track and transporting the same longitudinally with the wrench opening in the set screws extending in a predetermined direction;

Fig. 6 is a fragmentary plan view of the mechanism illustrated in Fig. 5;

Fig. 7 is a transverse sectional view taken on line 7—7, Fig. 5;

Fig. 8 is a transverse sectional view taken on line 8—8, Fig. 5;

Fig. 9 is a fragmentary plan view, illustrating the mechanism for positioning the set screws relative to a work piece and inserting the set screws into the work piece;

Fig. 10 is an enlarged front elevational view of a portion of the mechanism illustrated in Fig. 9;

Fig. 11 is a fragmentary front elevational view of the mechanism for initially receiving the set screws and transporting the same laterally;

Fig. 12 is a fragmentary longitudinal sectional view taken on line 12—12, Fig. 9;

Fig. 13 is a fragmentary longitudinal sectional view, illustrating the set screw, the set screw-driver and the work piece after the set screw is inserted into the work piece;

Fig. 14 is a fragmentary longitudinal sectional view taken on line 14—14, Fig. 9, illustrating the means for feeding the screws longitudinally to the set screw inserting mechanism and thereafter moving the same laterally; and, Fig. 15 is a schematic electrical and pneumatic diagram, illustrating the control mechanism for the feeding and inserting device of the present invention.

Referring more specifically to the drawings and particularly Fig. 1 thereof, reference numeral 20 designates generally a cylindrical hopper adapted to receive a plurality of set screws 21 each having a wrench socket 22 in one end thereof. The hopper 20 is supported by a conventional vibrator 23 which, in turn, is resiliently mounted on a support table 24 by means of a plurality of coil springs 25. The vibrator operates continuously, imparting a quick rotary oscillating motion to the hopper 20 which moves the set screws in the hopper outwardly to the periphery thereof and thereafter counterclockwise about the hopper, relative to Fig. 1.

In accordance with the present invention, a track 26 is secured to the inner surface of the hopper wall and spirals upward counterclockwise about the hopper wall. As illustrated in Fig. 2, the track 26 has a flared feed end extending radially of the hopper 20 in engagement with the bottom wall of the hopper. By this construction, the set screws moving counterclockwise about the periphery of the hopper 20 engage the feed end of the track and continue moving counterclockwise about the hopper upwardly along the spiral track 26. The track 26 comprises an inner vertical side wall portion 28 and a bottom wall portion 29 which extends at right angles to the inner wall portion 28 at the feed end thereof. The bottom wall portion tapers inwardly and upwardly away from the feed end to lie in a plane extending at an acute angle to the side wall 28 of the track and has an upwardly curved lip portion 29a thereon at the edge opposite the inner side wall of the track. As the set screws move upwardly around the track they slide toward the side wall of the hopper down the inclined bottom wall of the track into engagement with the track side wall portion 28, and thereby are caused to pass axially along the track.

In some instances a set screw might possibly be positioned on the track 26 in a vertical position and transported along the track 26 while standing upright in the vertical position. Accordingly, means are provided to discharge such set screws from the track 26. As illustrated in Figs. 1, 3 and 4, an ejector plate 31 is positioned upwardly adjacent the track 26 at approximately the mid-point thereof and has a forwardly inclined end portion which overlies the track 26 and is positioned above the bottom wall of the track a distance slightly greater than the diameter of the set screws being transported along the track. The ejector plate 31 will engage the upper end portion of any set screws standing in a vertical position on the track while the set screws are moving along the track and force the same toward the inner edge portion of the track. A cut-out 32 is provided at the inner edge portion of the track immediately beneath the ejector plate 31 and any set screws being forced towards the inner edge of the track by the ejector plate will fall downwardly through the cut-out 32 to the bottom of the hopper 20.

The track 26 spirals upwardly counterclockwise about the periphery of the hopper 20 and terminates at a point beneath the upper edge of the hopper wall in advance of the feed end of the track. With reference to Figs. 5 and 6, the discharge end of the track 26 terminates in a downwardly inclined portion 33 over which the set screws pass and slide downwardly toward the base of the hopper. A pair of spaced apart coil spring members 34, 34 are secured to the discharge end of the track, for example by means of a pin 35, as illustrated in Fig. 5, and form a downwardly inclined track extension adapted to support the set screws during the downward passage thereof. When the set screws leave the discharge end of the track 26, they continue their downward passage sliding along the coil springs 34, 34 toward the base of the hopper 20.

In accordance with the present invention, the set screws sliding downwardly along the coil spring members 34, 34 with the wrench socket at the forward end thereof are automatically removed from the coil springs 34, 34 and transported to the set screw inserting mechanism, while the set screws which have the wrench socket at the rear end thereof are forced through the coil springs 34, 34 and returned to the hopper. The set screws sliding down the pair of coil springs 34, 34 with the wrench socket at the forward end thereof are removed from the coil springs by means of a rotary wheel 36 having a plurality of lugs 37 thereon adapted to enter the wrench socket of the set screw and pick the set screw off of the coil springs. The wheel 36 rotates in the counterclockwise direction relative to Fig. 5 while the lugs 37 extend radially outward from the wheel 36 and terminate in peripheral end portions 37a which extend in the direction of rotation of the wheel 36 and are adapted to enter the wrench socket of the set screws. When a set screw slides down over the coil springs 34, 34 with the wrench socket at the rear end thereof, the lugs 37 engage the set screw and force the same up the coil springs. When the lug becomes disengaged from the set screw, the set screw again slides down the track and when the set screw is again engaged by a lug 37, the set screw is in a position wherein the lug 37 engages the top of the set screw and forces the set screw downwardly through the coil springs 34, 34 spreading the coil springs, so that the set screw may pass therebetween.

As a lug 37 on the wheel 36 carries a set screw around the wheel to the upper portion thereof, the set screw is removed from the lug by means of a pair of conveyor belts 39, 39 which move in the same direction as the wheel 36 at a greater speed than the peripheral speed of the wheel 36. The conveyors 39, 39 are disposed at opposite sides of the wheel 36 and pass about pulleys 41, 41 mounted for rotary movement about a shaft 42 which rotatably drive the wheel 36, as illustrated in Fig. 8. The conveyor belts 39, 39 are engaged within a pair of grooves on a drive pulley 43 mounted forwardly of the wheel 36 and carry the set screws forwardly away from the wheel 36. The drive pulley 43, in turn, is fixed to a shaft 44 driven by a small electric motor 45 by means of a flexible drive belt 46 and a pulley 47 secured to the shaft 44. A second pulley 48 mounted on the shaft 44 carries a drive belt 49 which passes over a pulley 51 fixedly secured to the shaft 42 mounting the wheel 36, so that the shafts 42 and 44 are driven in the same direction at different rates of speed with the conveyor belt 39, 39 traveling faster than the peripheral speed of the wheel 36.

Mounted on a bracket 53 disposed upwardly adjacent the pulley 43 and extending rearwardly therefrom is a pair of coil springs 54, 54 which overlie the conveyors 39, 39 and have their free ends terminating upwardly adjacent the wheel 36. The coil springs 54, 54 serve as guide members for the set screws being transported by the conveyors 39, 39 to maintain the set screws in position on the conveyors 39, 39. In addition, a guard plate 55 constructed as illustrated in Figs. 5, 6 and 7 of the drawings is positioned beneath the upper run of the conveyor belts 39, 39 and overlies the inner edge of the drive pulley 43 to direct any set screws which might fall off of the conveyor belts 39, 39 away from the guide pulley 43 and the lower run of the conveyor belts.

Disposed forwardly adjacent the drive pulley 43 is an enclosed track 57 which has its feed end positioned adjacent the drive pulley 43 and is adapted to receive set screws being transported by the conveyor belts 39, 39. The track 57 extends downwardly at a relatively steep angle, as illustrated in Fig. 1 of the drawings, and the set screws deposited in the track 57 by the conveyors 39, 39 slide downwardly along the track 57 to the discharge end thereof. A longitudinal slot 58 is provided along one side of the track 57, so that the operator of the machine may determine at a glance how great a supply of set screws is contained in the track 57, and also may have access to the set screws in case they jam in the track 57.

As illustrated in Figs. 1, 9 and 14, the track 57 terminates intermediate a pair of complementary gripping elements 61 and 62, each of which has arcuate concave faces 63 and 64, respectively, which face one another and between which the set screw is deposited by the track 57. The gripping member 61 has a stop member 65 extending upwardly therefrom adapted to be engaged by an adjusting bolt 66 carried by the gripping member 62. The adjusting bolt 66 engages the forward face of the stop member 65 when the distance between the concave faces 63 and 64 of the gripping members is slightly greater than the diameter of the set screws fed to the gripping members, so that the gripping members will loosely support the set screw therebetween. When it is desired to use the machine of the present invention for feeding and inserting set screws of different diameters, the position of the adjusting bolt relative to the gripping member 62 may be changed.

The gripping member 61 has a support arm 67 extending to the left with respect to Figs. 9 and 10, which is adjustably secured to the forward end of the piston rod 68 of an air cylinder 69, for example, as indicated at 71. When air under pressure is admitted to the left hand end of the cylinder 69, the gripping member 61 is forced to the right relative to Fig. 10 and the stop member 65 of the gripping member 61 engages the adjusting bolt 66 of the member 62 to thereby force the member 62 to the right. This moves the set screw carried between the two gripping members to the right a predetermined distance. The gripping member 62 is carried by a supporting arm 73 which extends to the right relative to Figs. 9 and 10 and passes through a cylinder 74. A coil spring 75 mounted within the cylinder 74 in engagement with a shoulder 76 on the supporting arm 73 normally forces the gripping member to the left relative to Fig. 9. The extreme right hand end of the supporting arm 73 is threaded, as indicated at 77, and carries an adjusting nut 78 which serves as a stop to limit movement of the gripping member 62 to the left relative to Fig. 9 and positions the gripping member with respect to the track 57 to receive a set screw from the track 57.

When the gripping elements 61 and 62 are in their retracted or left hand position, as shown in Fig. 10, the concave surfaces 63 and 64 of the gripping elements are positioned at opposite sides of the longitudinal axis of the track 57 and a set screw is placed intermediate the gripping elements 61 and 62 by the track 57. After a set screw is in position between the two gripping elements, air under pressure is admitted to the left hand end of the cylinder 69 and the piston 68 of the cylinder 69 is moved to the right a predetermined distance. This, in turn, moves the gripping elements and the set screw carried therebetween to the right against the pressure of the coil spring 75.

When the piston of the cylinder 69 reaches its extreme right hand position, the set screw between the guide elements 61 and 62 is positioned in axial alignment with an opening 80 provided in a guide ferrule 81 carried by a guide plate 82 mounted outwardly adjacent the guide members 61 and 62, as illustrated in Fig. 12. The guide ferrule 81 is positioned in axial alignment with a hexagonal set screw drive bit 83 carried by the chuck 84 of a conventional tapping head 85 which, for example may be a Kingsbury Tapping Head.

While a set screw is being positioned in axial alignment with the guide ferrule 81, the operator of the machine positions a work piece, which in the present instance, is shown as a collar 87 at the opposite side of the ferrule from the set screw. The collar 87 has a threaded opening 88 therein adapted to receive the set screw, and the collar opening 88 is positioned co-axial with the opening in the guide ferrule. The work piece is carried by a supporting bracket 91 secured to the guide plate beneath the ferrule, for example, by means of bolts 92, 92 extending through elongated slots 93, 93 in the bracket 91 to permit the bracket to be adjusted vertically relative to the longitudinal axis of the ferrule. In addition, a V-shaped guide 94 is mounted on the upper surface of the bracket 91 to engage the collar and maintain the same in position relative to the ferrule 81.

After the set screw is positioned in axial alignment with the ferrule 81, the tappnig head 85 is advanced thereby advancing the chuck 84 and set screw drive bit 83 toward the set screw positioned in axial alignment with the ferrule. The set screw drive bit is rotated continuously by the tapping head and when it engages the set screw, it enters into the wrench opening at the rear edge of the set screw thereby forcing the set screw forwardly while rotating the set screw. Further forward movement of the set screw drive bit 83 engages the set screw within the threaded opening 88 of the collar 87 causing the set screw to be threaded into the collar 87. The tapping head and set screw drive bit are then retracted and the collar 87 and inserted set screw are removed from the supporting plate. The gripping elements 61 and 62 are returned to their retracted position by means of the air cylinder 69 and coil spring 75. Another set screw is then fed in between the gripping elements 61 and 62 and another collar is placed on the supporting bracket by the operator of the machine and the machine is prepared to repeat its cycle of operation.

Figure 15 is a schematic wiring and penumatic diagram of the control system for the set screw feeding and inserting apparatus of the present invention which causes the various elements of the machine to automatically complete one cycle of operation. To start the apparatus, the operator engages and closes a start switch 95 which completes a circuit to the solenoid coil 96 of a relay 97. When the relay is energized, a circuit is completed through two pairs of relay contacts 98, 98 and 99, 99. The holding circuit for the relay 97 is completed through the relay contacts 99, 99. In addition, upon energization of the relay 97, a second circuit is completed through the relay contacts 98, 98 which energizes the solenoid 101 of a valve 102. The valve 102 is connected to the air cylinder 69 which advances and retracts the gripping elements 61 and 62, and upon energization of the solenoid 101, the valve is moved to its position wherein air under pressure is admitted to the left hand end of the air cylinder 69, thus causing the gripping elements 61 and 62 to advance and position a set screw in axial alignment with the guide ferrule. When the gripping elements 61 and 62 reach their advanced position, a switch actuating member 103 carried at the forward end of the piston rod 68 of the cylinder 69 engages and closes a normally open microswitch 104. This completes a circuit to the solenoid 105 of a valve 106 which, in turn, is connected to air cylinder 107 operable to advance and retract the tapping head 85 in the conventional manner. Upon energization of the solenoid 105, the valve 106 is moved to a position wherein air under pressure is admitted to the cylinder 107 thereby advancing the tapping head 85.

When the tapping head 85 reaches its forward limit position and completes the insertion of a set screw into a collar 87, the forward end of the tapping head engages and opens a normally closed microswitch 108 which breaks the circuit to the solenoid 105 of the valve 106 causing the valve 106 to be moved to a position wherein the air is exhausted from the cylinder 107 permitting the tapping head 85 to be retracted. At the same time, when the microswitch 108 is opened the holding circuit for the relay 97 is broken thereby deenergizing the relay 97 and breaking the circuit to the solenoid 101 for the valve 102. This causes air under pressure to be admitted to the right hand end of the cylinder 69 and retracts the gripping elements 61 and 62. The gripping element 62 which normally is biased to the left by means of the coil spring 76 will engage again the surface of the set screw drive bit 83 and be prevented from moving to the left until the set screw drive bit is in its retracted position.

A normally closed microswitch 109 and a normally open microswitch 110 are connected in parallel in the line leading to the contacts 98 and 99 of the relay 97, and when both of these switches 109 and 110 are opened, a holding circuit may not be completed for the relay and the machine will not operate. The normally closed microswitch 109 is mounted adjacent the microswitch 104 and is opened by the switch actuating element 103 when the gripping element 61 is in its retracted position. The normally open microswitch 110 is positioned outwardly adjacent the guide plate 82, as illustrated in Fig. 14 and is engaged and closed when a set screw contacts a pin 111 extending through the guide plate 82. By this construction, when the gripping element 61 is in its rearward position, a set screw must be positioned in engagement with the pin 111 before the machine can be started. After all of the various elements of the machine return to their initial position, the operator of the machine can then start another cycle of operation by again closing the start switch 95. If something goes wrong during the operation of the machine, the operator may stop the machine by engaging and opening a stop switch 112.

While particular embodiments of the present invention have been illustrated and described herein, it is not intended to limit the invention to such a disclosure and changes and modifications may be incorporated and embodied therein within the scope of the following claims.

I claim:

1. Feeding and inserting apparatus for hollow set screws and the like comprising, a generally cylindrical hopper to receive the set screws, a track mounted interiorly of said hopper extending upwardly about the side wall of said hopper, the feed end of said track being disposed adjacent the base of said hopper, a vibrator connected to said hopper operable to impart oscillating movement to the hopper and the track and move the set screws radially outward relative to the hopper and around the periphery of the hopper in the direction of travel of the track and upwardly around the track, a discharge end on said track inclined downwardly toward the base of said hopper over which said set screws slide axially, a feed tube extending downwardly exteriorly of said hopper, a wheel rotatably mounted upwardly adjacent the discharge end of said track, a plurality of lugs extending radially outward from said wheel and terminating in end portions extending peripherally of said wheel, drive means to rotate said wheel and cause said lug end portions to engage the forward ends of the set screws sliding down the discharge end of said track, said lugs operable to enter the wrench openings of the set screws moving down the track with the wrench openings at the forward end thereof and lift the same off of said track and operable to engage and to exert pressure on the set screws moving down the track with the wrench openings at the rear end thereof and to eject the same from said track, the track at said discharge end comprising screw-supporting side members displaceable under the said pressure exerted on the screws by the lugs to release the screws from the track and to thereby effect said ejection, a pair of endless conveyor belts positioned at opposite sides of said wheel operable to remove the set screws from said wheel and deposit the same in said feed tube with the wrench opening of each set screw extending in the same direction, and drive means connected with said conveyor belts operable to drive said conveyor belts in the same direction of travel as said wheel at a speed greater than the peripheral speed of said wheel.

2. Feeding apparatus for hollow set screws and the like comprising: a generally cylindrical hopper to receive the set screws, a track mounted interiorly of said hopper extending upwardly about the side wall of the hopper, the feed end of said track being disposed adjacent the base of said hopper, a vibrator connected to said hopper operable to impart oscillating movement to the hopper and the track and move the set screws radially outward relative to the hopper around the periphery of the hopper in the direction of travel of the track and upwardly around the track, a discharge end on said track inclined downwardly toward the base of the hopper, a pair of spaced parallel resilient members secured to the discharge end of said track and projecting angularly downward therefrom operable to support said set screws and over which said set screws slide axially, and means mounted upwardly adjacent said resilient members movable in the path of movement of the screws on the said members and opposite to the direction of said sliding movement and adapted for engagement in the wrench openings in said screws when the said openings are at the leading ends of the screws with respect to the said direction of their movement so as to remove the set screws from said resilient members, and means for receiving the screws thus removed from the resilient members by said means in mutually oriented positions.

3. Feeding apparatus for hollow set screws and the like comprising: a generally cylindrical hopper to receive the set screws, a track mounted interiorly of said hopper extending upwardly about the side wall of the hopper, the feed end of said track being disposed adjacent the base of said hopper, a vibrator connected to said hopper operable to impart oscillating movement to the hopper and the track and move the set screws radially outward relative to the hopper around the periphery of the hopper in the direction of travel of the track and upwardly around the track, a discharge end on said track inclined downwardly toward the base of the hopper, a pair of spaced parallel resilient members secured to the discharge end of said track and projecting angularly downward therefrom operable to support said set screws and over which said set screws slide axially, a wheel mounted upwardly adjacent said resilient members, a plurality of lugs extending radially outward from said wheel and terminating in end portions extending peripherally of said wheel, drive means to rotate said wheel and cause said lug end portions to engage the forward ends of the set screws sliding down said resilient members, said lugs operable to enter the wrench openings of the set screws moving down the track with the wrench openings at the forward end thereof and lift the same off of said resilient members and operable to engage the set screws moving down the resilient members with the wrench openings at the rear end thereof and force the same downwardly between said resilient members, and means for receiving the screws in mutually oriented positions from said lugs.

4. Feeding apparatus for hollow set screws and the like comprising: a generally cylindrical hopper to receive the set screws, a track mounted interiorly of said hopper extending upwardly about the side wall of the hopper, the feed end of said track being disposed adjacent the base of said hopper, a vibrator connected to said hopper operable to impart oscillating movement to the hopper and the track and move the set screws radially outward relative to the hopper around the periphery of the hopper in the direction of travel of the track and upwardly around the track, a discharge end on said track inclined downwardly toward the base of the hopper, a pair of spaced parallel resilient members secured to the discharge end of said track and projecting angularly downward therefrom operable to support said set screws and over which said set screws slide, a feed tube extending downwardly exteriorly of said hopper, a wheel mounted upwardly adjacent said resilient members, a plurality of lugs extending radially outward from said wheel and terminating in end portions extending peripherally of said wheel, drive means to rotate said wheel and cause said lug end portions to engage the forward ends of the set screws sliding down said resilient members, said lugs operable to enter the wrench openings of the set screws moving down the track with the wrench openings at the forward end thereof and lift the same off of said resilient members and operable to engage the set screws moving down the resilient members with the wrench openings at the rear end thereof and force the same downwardly between said resilient members, and means operable to receive the set screws from said wheel and deposit the same in said feed tube with the wrench openings of each set screw extending in the same direction.

5. Feeding apparatus for hollow set screws and the like comprising: a generally cylindrical hopper to receive the set screws, a track mounted interiorly of said hopper extending upwardly about the side wall of the hopper, the feed end of said track being disposed adjacent the base of said hopper, a vibrator connected to said hopper operable to impart oscillating movement to the hopper and the track and move the set screws radially outward relative to the hopper around the periphery of the hopper in the direction of travel of the track and upwardly around the track, a discharge end on said track inclined downwardly toward the base of the hopper, a pair of spaced parallel resilient members secured to the discharge end of said track and projecting angularly downward therefrom operable to support said set screws and over which said set screws slide, a feed tube extending downwardly exteriorly of said hopper, a wheel mounted upwardly adjacent said resilient members, a plurality of lugs extending radially outward from said wheel and terminating in end portions extending peripherally of said wheel, drive means to rotate said wheel and cause said lug end portions to engage the forward ends of the set screws sliding down said resilient members, said lugs operable to enter the wrench openings of the set screws moving down the track with the wrench openings at the forward end thereof and lift the same off of said resilient members operable to engage the set screws moving down the resilient members with the wrench openings at the rear end thereof and force the same downwardly between said resilient members, a pair of endless conveyor belts positioned at opposite sides of said wheel operable to remove said set screws from said wheel and deposit the same in said feed tube with the wrench opening of each set screw extending in the same direction, and drive means connected with said conveyor belt operable to drive said conveyor belt in the same direction of travel as said wheel at a speed greater than the peripheral speed of said wheel.

6. Feeding apparatus for hollow set screws and the like comprising: a generally cylindrical hopper to receive the set screws, a track mounted interiorly of said hopper extending upwardly about the side wall of said hopper, the feed end of said track being disposed adjacent the base of said hopper, a vibrator connected to said hopper operable to impart oscillating movement to the hopper and the track and move the set screws radially outward relative to the hopper and around the periphery of the hopper in the direction of travel of the track, a discharge end on said track inclined downwardly toward the base of said hopper over which said set screws slide axially, a feed tube extending downwardly exteriorly of said hopper, a wheel rotatably mounted upwardly adjacent the discharge end of said track, a plurality of lugs extending radially outward from said wheel and terminating in end portions extending peripherally of said wheel, drive means to rotate said wheel and cause said lug end portions to engage the forward ends of the set screws sliding down the discharge end of said track, said lugs operable to enter the wrench openings of the set screws moving down the track with wrench openings at the forward end thereof and lift the same off of said track and operable to engage the set screws moving down the track with the wrench openings at the rear end thereof and eject the same from said track, a pair of endless conveyor belts positioned at opposite sides of said wheel operable to remove the set screws from said wheel and deposit the same in said feed tube with the wrench opening of each set screw extending in the same direction, drive means connected with said conveyor belts operable to drive said conveyor belts in the same direction of travel as said wheel at a speed greater than the peripheral speed of said wheel, and a pair of spaced parallel resilient guide members mounted upwardly adjacent said conveyor belts in spaced parallel relation therewith above the set screws on said conveyor belts operable to maintain said set screws in position on said conveyor belts.

7. Apparatus for feeding hollow set screws and the like and positioning the same relative to a work piece comprising: a generally cylindrical hopper to receive the set screws, a track mounted interiorly of said hopper extending upwardly about the side wall of said hopper, the feed end of said track being disposed adjacent the base of said hopper, a vibrator connected to said hopper operable to impart oscillating movement to the hopper and the track and move the set screws radially outward relative to the hopper and around the periphery of the hopper in the direction of travel of the track and upwardly around the track, a discharge end on said track adjacent the hopper side wall inclined downwardly toward the base of said hopper over which said set screws slide axially, a feed tube extending downwardly exteriorly of said hopper, transfer means movable in the path of and opposite to the direction of movement of the screws on the discharge end of said track and adapted to enter the wrench openings of the screws when said openings are presented at the leading ends of the screws and to transfer the screws in mutually oriented relation to the feed tube, support means spaced from the lower end of said tube operable to support a work piece, and transfer means actuatable between opposite limit positions between said tube and said support means operable to receive a set screw from said tube and transfer the same to a position adjacent said work piece.

References Cited in the file of this patent

UNITED STATES PATENTS

| 85,224 | French | Dec. 22, 1868 |
| 2,336,573 | Seeley | Dec. 14, 1943 |
| 2,543,244 | Klooz | Feb. 27, 1951 |
| 2,628,520 | Bailey | Feb. 17, 1953 |
| 2,638,945 | Austin | May 19, 1953 |

FOREIGN PATENTS

| 559,375 | Germany | Sept. 1, 1932 |
| 655,453 | Great Britain | July 25, 1951 |